US010310480B2

(12) United States Patent
Manson

(10) Patent No.: US 10,310,480 B2
(45) Date of Patent: Jun. 4, 2019

(54) SYSTEMS AND METHODS FOR UNDER-FREQUENCY BLACKOUT PROTECTION

(71) Applicant: Schweitzer Engineering Laboratories, Inc., Pullman, WA (US)

(72) Inventor: Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 369 days.

(21) Appl. No.: 14/686,643

(22) Filed: Apr. 14, 2015

(65) Prior Publication Data

US 2015/0222123 A1  Aug. 6, 2015

Related U.S. Application Data

(63) Continuation-in-part of application No. 13/195,227, filed on Aug. 1, 2011, now Pat. No. 9,008,850.

(60) Provisional application No. 61/376,348, filed on Aug. 24, 2010.

(51) Int. Cl.
| | |
|---|---|
| *G05B 15/02* | (2006.01) |
| *G05B 19/05* | (2006.01) |
| *H02J 3/14* | (2006.01) |
| *H02J 13/00* | (2006.01) |

(52) U.S. Cl.
CPC ............. *G05B 19/058* (2013.01); *H02J 3/14* (2013.01); *H02J 13/0006* (2013.01); *Y02B 70/3225* (2013.01); *Y02E 60/724* (2013.01); *Y04S 10/18* (2013.01); *Y04S 20/222* (2013.01); *Y04S 20/224* (2013.01)

(58) Field of Classification Search
CPC ...... H02J 2003/388; H02J 3/24; Y02E 60/728; Y02E 60/74; Y04S 10/265; Y04S 10/30; Y04S 20/222; Y02B 70/3225
See application file for complete search history.

(56) References Cited

U.S. PATENT DOCUMENTS

| | | |
|---|---|---|
| 4,349,744 A | 9/1982 | Reuther |
| 4,387,336 A | 6/1983 | Joy |
| 4,829,298 A | 5/1989 | Fernandes |
| 5,006,846 A | 4/1991 | Granville |
| 5,224,011 A | 6/1993 | Yalla |

(Continued)

OTHER PUBLICATIONS

Greg Zweigle, Expand Synchrophasor Capabilities with the Substation Phasor Data Concentrator, Feb. 18, 2010.

(Continued)

*Primary Examiner* — Darrin D Dunn
(74) *Attorney, Agent, or Firm* — John P. Davis; Richard M. Edge

(57) ABSTRACT

Detection of which generators are connected using a common, isolated sub-grid using information from intelligent electronic devices (IEDs) in communication with each generator is disclosed herein. Each IED receives rotor position information from a rotor position detection device of the generator. Each IED may then calculate rotor speed, information of the generator and transmit such information to a central IED. The central IED uses the rotor speed information to determine which generators are connected to a common, isolated sub-grid. The central IED may further use rotor position, rotor speed, and rate-of-change-of-speed information either calculated at the central IED or transmitted from the IEDs.

12 Claims, 9 Drawing Sheets

(56) References Cited

U.S. PATENT DOCUMENTS

| | | | |
|---|---|---|---|
| 5,341,265 A | 8/1994 | Westrom | |
| 5,446,682 A | 8/1995 | Janke | |
| 5,498,956 A | 3/1996 | Kinney | |
| 5,592,393 A | 1/1997 | Yalla | |
| 5,596,492 A | 1/1997 | Divan | |
| 5,693,404 A | 12/1997 | Shiraishi et al. | |
| 5,694,281 A | 12/1997 | Roberts | |
| 5,703,745 A | 12/1997 | Roberts | |
| 5,731,943 A | 3/1998 | Roberts | |
| 6,028,754 A | 2/2000 | Guzman | |
| 6,236,949 B1 | 5/2001 | Hart | |
| 6,265,881 B1 | 7/2001 | Meliopoulos | |
| 6,285,917 B1 | 9/2001 | Sekiguchi | |
| 6,341,055 B1 | 1/2002 | Guzman | |
| 6,356,421 B1 | 3/2002 | Guzman | |
| 6,356,471 B1 | 3/2002 | Fang | |
| 6,411,865 B1 | 6/2002 | Qin | |
| 6,442,010 B1 | 8/2002 | Kasztenny | |
| 6,446,682 B1 | 9/2002 | Viken | |
| 6,603,298 B2 | 8/2003 | Guzman | |
| 6,608,742 B2 | 8/2003 | Schweitzer | |
| 6,662,124 B2 | 12/2003 | Schweitzer | |
| 6,694,270 B2 | 2/2004 | Hart | |
| 6,757,146 B2 | 6/2004 | Benmouyal | |
| 6,822,457 B2* | 11/2004 | Borchert | G01R 31/3275 324/512 |
| 6,839,210 B2 | 1/2005 | Roberts | |
| 6,845,333 B2 | 1/2005 | Anderson | |
| 6,946,753 B2 | 9/2005 | Kernahan | |
| 7,072,744 B2 | 7/2006 | Kuwabara | |
| 7,116,010 B2 | 10/2006 | Lasseter | |
| 7,196,884 B2 | 3/2007 | Guzman | |
| 7,319,576 B2 | 1/2008 | Thompson | |
| 7,356,422 B2 | 7/2008 | Schweitzer | |
| 7,457,688 B2 | 11/2008 | Szepek | |
| 7,480,580 B2 | 1/2009 | Zweigle | |
| 7,570,469 B2 | 8/2009 | Guzman | |
| 7,582,986 B2 | 9/2009 | Folkers | |
| 7,630,863 B2 | 12/2009 | Zweigle | |
| 7,635,967 B2 | 12/2009 | Loucks | |
| 7,660,088 B2 | 2/2010 | Benmouyal | |
| 7,710,693 B2 | 5/2010 | Guzman | |
| 7,761,910 B2 | 7/2010 | Ransom | |
| 7,856,327 B2 | 12/2010 | Schweitzer | |
| 7,903,381 B2 | 3/2011 | Fischer | |
| 7,930,117 B2 | 4/2011 | Guzman-Casillas | |
| 8,082,367 B2 | 12/2011 | Etheridge | |
| 8,410,633 B2 | 4/2013 | Batzler | |
| 8,498,751 B2* | 7/2013 | Meier | H02P 9/04 700/287 |
| 8,560,255 B2 | 10/2013 | Elwarry | |
| 8,606,422 B2* | 12/2013 | Sun | H02J 3/14 700/292 |
| 8,965,592 B2 | 2/2015 | Manson | |
| 9,008,850 B2 | 4/2015 | Manson | |
| 9,494,637 B2* | 11/2016 | Hellberg | H02J 3/381 |
| 2004/0021470 A1 | 2/2004 | Adams | |
| 2004/0027748 A1 | 2/2004 | Kojovic | |
| 2004/0059469 A1 | 3/2004 | Hart | |
| 2004/0138834 A1 | 7/2004 | Blackett | |
| 2004/0252525 A1 | 12/2004 | Aldridge | |
| 2005/0080549 A1* | 4/2005 | Guillarme | G01D 5/242 701/113 |
| 2005/0144437 A1 | 6/2005 | Ransom | |
| 2006/0224336 A1 | 10/2006 | Petras | |
| 2006/0259255 A1 | 11/2006 | Anderson | |
| 2007/0086134 A1 | 4/2007 | Zweigle | |
| 2007/0100504 A1 | 5/2007 | Moxley | |
| 2007/0100506 A1* | 5/2007 | Teichmann | H02J 3/24 700/297 |
| 2007/0103004 A1 | 5/2007 | Chou | |
| 2007/0198133 A1* | 8/2007 | Hirst | H02J 3/14 700/295 |
| 2007/0219755 A1 | 9/2007 | Williams | |
| 2007/0222294 A1 | 9/2007 | Tsukida | |
| 2007/0239372 A1* | 10/2007 | Schweitzer | H02J 3/14 702/57 |
| 2008/0040296 A1 | 2/2008 | Bridges | |
| 2008/0204044 A1 | 8/2008 | Ponnaluri | |
| 2008/0232005 A1 | 9/2008 | Kuehnle | |
| 2008/0281540 A1 | 11/2008 | Zweigle | |
| 2009/0012916 A1* | 1/2009 | Barnett | G06Q 50/06 705/412 |
| 2009/0021082 A1 | 1/2009 | Loucks | |
| 2009/0063228 A1* | 3/2009 | Forbes, Jr. | G01D 4/004 705/7.25 |
| 2009/0079266 A1 | 3/2009 | McNamara | |
| 2009/0085407 A1 | 4/2009 | Venkatasubramanian | |
| 2009/0088989 A1 | 4/2009 | Guzman | |
| 2009/0088990 A1 | 4/2009 | Schweitzer | |
| 2009/0089608 A1* | 4/2009 | Guzman-Casillas | G01R 29/18 713/340 |
| 2009/0091303 A1* | 4/2009 | Schweitzer, III | H02K 11/22 322/99 |
| 2009/0091867 A1 | 4/2009 | Guzman | |
| 2009/0099798 A1 | 4/2009 | Gong | |
| 2009/0125158 A1 | 5/2009 | Schweitzer | |
| 2009/0187284 A1* | 7/2009 | Kreiss | G06Q 50/06 700/291 |
| 2009/0198383 A1* | 8/2009 | Gardner | H02J 3/08 700/286 |
| 2009/0254655 A1* | 10/2009 | Kidwell | H04L 41/0226 709/224 |
| 2009/0276173 A1 | 11/2009 | Wang | |
| 2009/0281742 A1* | 11/2009 | Carter | G01D 4/002 702/60 |
| 2010/0002348 A1 | 1/2010 | Donolo | |
| 2010/0104847 A1 | 4/2010 | Ciavatta | |
| 2010/0114390 A1 | 5/2010 | Stevenson | |
| 2010/0145536 A1 | 6/2010 | Masters | |
| 2010/0152910 A1 | 6/2010 | Taft | |
| 2010/0179670 A1* | 7/2010 | Forbes, Jr. | G01D 4/004 700/22 |
| 2010/0198423 A1 | 8/2010 | Hirst | |
| 2011/0004324 A1* | 1/2011 | Bickel | G01D 4/002 700/3 |
| 2011/0022734 A1 | 1/2011 | Etheridge | |
| 2011/0062708 A1* | 3/2011 | Prochaska | F02D 29/06 290/7 |
| 2011/0068576 A1* | 3/2011 | Meier | H02P 9/04 290/7 |
| 2011/0077885 A1* | 3/2011 | Zweigle | G01R 19/2513 702/66 |
| 2011/0153246 A1* | 6/2011 | Donaldson | G01R 21/1331 702/65 |
| 2011/0190958 A1 | 8/2011 | Hirst | |
| 2011/0213606 A1 | 9/2011 | Seaman | |
| 2011/0251732 A1 | 10/2011 | Schweitzer | |
| 2011/0298286 A1 | 12/2011 | Batzler | |
| 2012/0226386 A1 | 9/2012 | Kulathu | |
| 2014/0152331 A1* | 6/2014 | Wagoner | G01R 27/16 324/705 |

OTHER PUBLICATIONS

Andrew Swinghamer, Create a Synchrophasor Network with the SEL-3378 Synchrophasor Vector Processor, Aug. 6, 2009.

Yanfeng Gong, Using Synchrophasor-Based Modal Analysis to Detect Unstable Power System Oscillations, Jun. 24, 2009.

Schweitzer Engineering Laboratories, Inc., Case Study, Powergrid Corporation—India, Using Wide-Area Synchrophasor Measurements to Improve System Reliability, Sep. 10, 2010.

Schweitzer Engineering Laboratories, Inc., SEL-3378 Instruction Manual, Apr. 4, 2008.

Schweitzer Engineering Laboratories, Inc., SEL-3530 Real-Time Automation Controller RTAC Instruction Manual, Sep. 15, 2009.

Terry L. Conrad, Distributed State Estimator at U.S. Virgin Islands Water and Power Authority St. Thomas and St. John, NASPI Working Group Meeting, Mar. 7, 2008.

(56) References Cited

OTHER PUBLICATIONS

A.P. Sakis Meliopoulos, George J. Cokkinides, Floyd Galvan, Bruce Fardanesh, Distributed State Estimator-Advances and Demonstration, Jan. 2008.
Pserc- Ali Abur andmladen Kezunovic, Sakis Meliopoulos, Enhanced State Estimation by Advanced Substation Monitoring, Power Systems Engineering Research Center, Nov. 2002.
Saman A. Zonouz and William H. Sanders, A Kalman-based Coordination for Hierarchical State Estimation: Algorithm and Analysis, Jan. 2008.
ABB: Improved Power System Performance through Wide Area Monitoring, Protection, and Control, Jan. 2004.
ABB, Wide Area Measurement, Monitoring, Protection and Control Industrial IT for Energy System Operation-, Jan. 2003.
Sasa Jakovljevic, Mladen Kezunovic, Software for Enhanced Monitoring in Integrated Substations, 2003 IEEE Bologna Power Tech Conference, Jun. 23-26, 2003.
Y. Wu, M. Kezunovic, Automatic Simulation of IED Measurements for Substation Data Integration Studies, Power Engineering Society General Meeting, Jun. 12-16, 2005.
Sasa Jakovljevic, Data Collecting and Processing for Substation Integration Enhancement, May 2003.
M. Kezunovic, G. Latisko, Automated Monitoring Functions for Improved Power System Operation and Control, Power Engineering Society General Meeting, Jun. 12-16, 2005.
PCT/US2011/046437 International Search Report and Written Opinion of the International Searching Authority, Patent Cooperation Treaty, dated Dec. 16, 2011.
Arshad Saleem, Agent Services for Situation Aware Control of Power Systems with Distributed Generation, 2009 IEEE [retrieved on Jan. 28, 2013 from the internet <url:http://orbit.dtu.dk/fedora/objects/orbit:55496/datastreams/file_3761170/content> ].
Chanin Choniratisai, HVDC Stability Functions and Implementation in Thailand, CEPSI 2004. [retrieved on Jan. 28, 2013 from the internet <URL://http://www.researchgate.net/CEPSI2004> ].
PCT/US2012/0068962 International Search Report and Written Opinion of the International Searching Authority, Patent Cooperation Treaty, dated Feb. 25, 2013.
G.T. Heydt, C.C. Liu, A.G. Phadke, V. Vittal, Solutions for the Crisis in Electric Power Supply, IEEE Computer Applications in Power, Jul. 2001.
Luc Meysenc, M. Jylhakallio, Peter Barbosa, Power Electronics Cooling Effectiveness Versus Thermal Inertia, IEEE Transactions on Power Electronics, vol. 20, No. 3, May 2005.
R.A. Walling, N.W. Miller, Distributed Generation Islanding-Implications on Power System Dynamic Performance, IEEE Power Enginnering Society Summer Meeting vol. 1, Jul. 25, 2002.
M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.
Mats Larsson, Christian Rehtanz, Predictive Frequency Stability Control Based on Wide-Area Phasor Measurements, IEEE Power Engineering Society Summer Meeting vol. 1, Jul. 2002.
Jun Yin, Liuchen Chang, Chris Diduch, Recent Developments in Islanding Detection for Distributed Power Generation, IEEE Power Engineering, Jul. 2004.
Xiaoming Wang, Vijay Vittal, System Islanding Using Minimal Cutsets with Minimum Net Flow, IEEE Power Systems Conference and Exposition, Oct. 2004.
Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.
Robert J. Best, D. John Morrow, David J. Mcgowan, Peter A. Crossley, Synchronous Islanded Operation of a Diesel Generator, IEEE Transactions on Power Systems, vol. 22, No. 4, Nov. 2007.
Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.
Gabriel Benmouyal, E. O. Schweitzer, A. Guzman, Synchronized Phasor Measurement in Protective Relays for Protection, Control, and Analysis of Electric Power Systems, 29th Annual Western Protective Relay Conference, Oct. 22-24, 2002.
A.G. Phadke, Synchronized Phasor Measurement in Power Systems, IEEE Comput. Appl., vol. 6, No. 2, pp. 10-15, Apr. 1993.
Edmund O. Schweitzer, III, David Whitehead, Armando Guzman, Yanfeng Gong, Marcos Donolo, Advanced Real-Time Synchrophasor Applications, Western Protective Relay Conference, Oct. 2008.
Dale Williston, Dale Finney, Consequences of Out-of-Phase Reclosing on Feeders with Distributed Generators, Dec. 3, 2010.
Michael J. Thompson, Fundamentals and Advancements in Generator Synchronizing Systems, Dec. 9, 2010.
Michael J. Thompson, New Developments in Generator Synchronizing Systems, Feb. 10, 2011.
PCT/US2012/055107 Patent Cooperation Treaty, International Search Report and Written Opinion of the International Searching Authority, dated Nov. 23, 2012.

\* cited by examiner

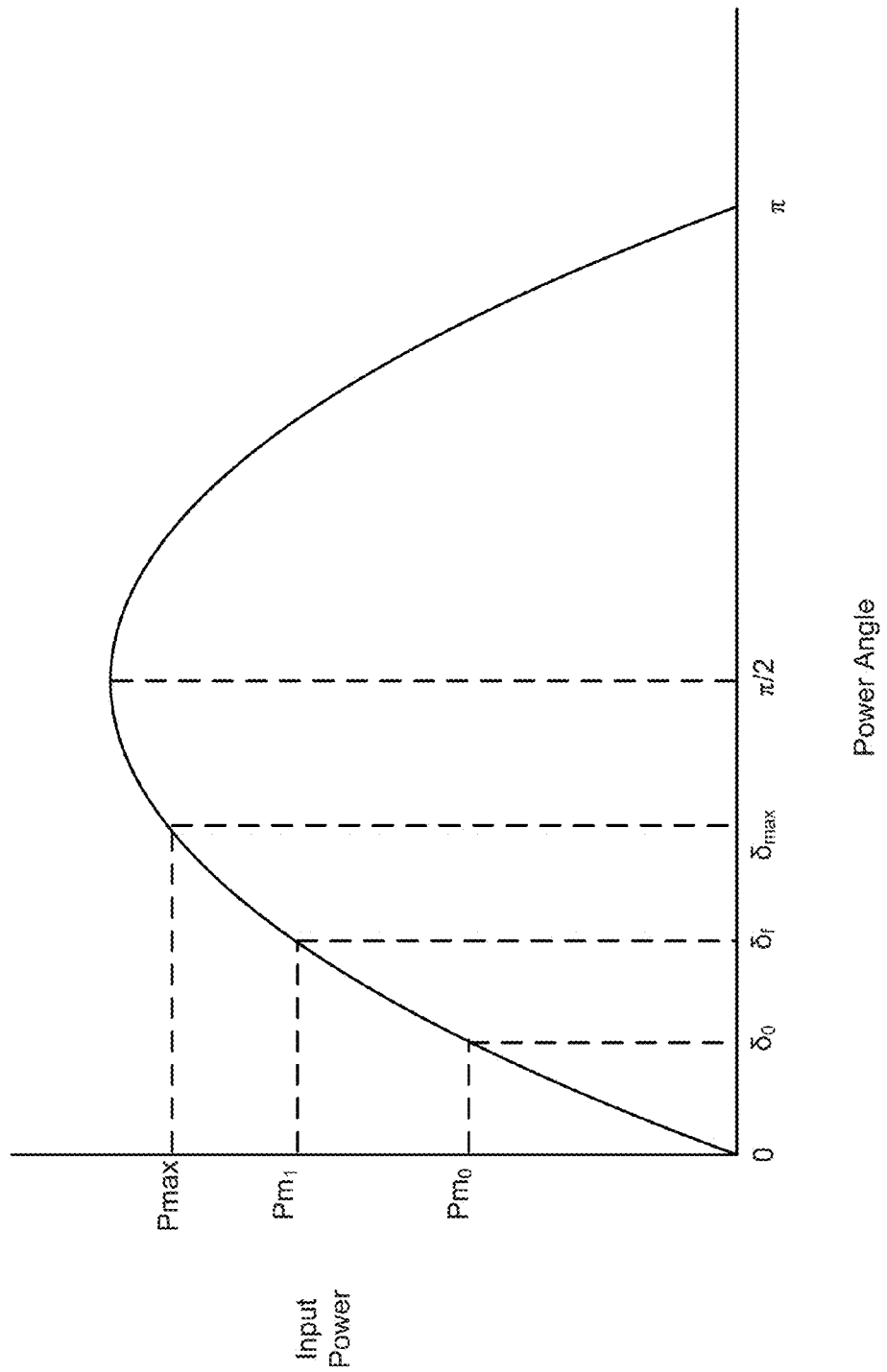

SYSTEMS AND METHODS FOR UNDER-FREQUENCY BLACKOUT PROTECTION

RELATED APPLICATIONS

This application is a continuation-in-part of U.S. Non-Provisional patent application Ser. No. 13/195,227, filed 1 Aug. 2011, titled "SYSTEMS AND METHODS FOR UNDER-FREQUENCY BLACKOUT PROTECTION", which claims priority under 35 U.S.C. § 119(e) to U.S. Provisional Patent Application No. 61/376,348, filed Aug. 24, 2010, titled "WIDE AREA UNDER-FREQUENCY BLACKOUT PROTECTION SYSTEM," which are hereby incorporated by reference in its entirety.

TECHNICAL FIELD

This disclosure relates to systems and methods for controlling and protecting an electric power delivery system and, more particularly, to systems and methods for wide-area under-frequency blackout protection in an electric power delivery system using rotor angles of synchronous machines.

BRIEF DESCRIPTION OF THE DRAWINGS

Non-limiting and non-exhaustive embodiments of the disclosure are described, including various embodiments of the disclosure, with reference to the figures, in which:

FIG. 6 illustrates a power angle curve for an exemplary power generator.

DETAILED DESCRIPTION

Figure 1:
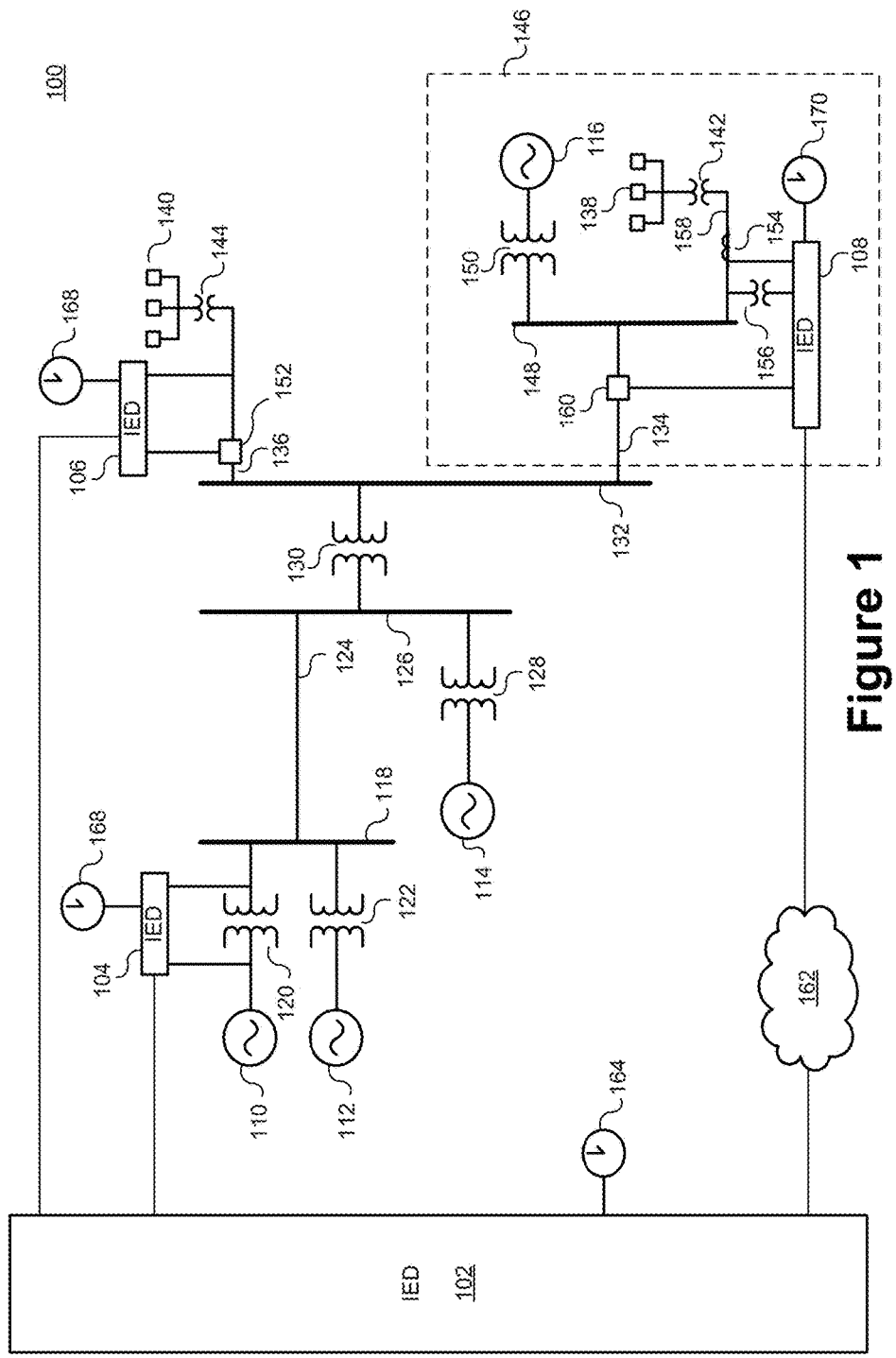
FIG. 1 illustrates a simplified diagram of one embodiment of an electric power delivery system that includes intelligent electronic devices.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments described are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Electrical power generation and delivery system equipment may be monitored and protected from various malfunctions and/or conditions using one or more IEDs. For example, an IED may be configured to protect the electrical power system equipment from abnormal conditions, such as when the power generation capabilities of the electrical power system cannot adequately supply system loads. Under this unbalanced system condition, power loss or blackouts may occur that negatively affect both providers of electric power and their customers. Consistent with embodiments disclosed herein, an IED may utilize under-frequency (UF) load shedding techniques to minimize blackout conditions on a larger portion of the electric power delivery system.

Power imbalances in an electrical power delivery system may be associated with a fall in the frequency of the electrical power system fundamental voltage. Consistent with embodiments disclosed herein, when a threshold UF level is crossed, loads may be disconnected (e.g., shedded) from the electrical power system to rebalance the system. By shedding selective loads and rebalancing the system, the negative effects of unbalanced system conditions may be mitigated.

FIG. 1 illustrates a simplified diagram of an electric power generation and delivery system 100 that includes IEDs 102-108 consistent with embodiments disclosed herein. Although illustrated as a one-line diagram for purposes of simplicity, electrical power generation and delivery system 100 may also be configured as a three phase power system. Moreover, embodiments disclosed herein may be utilized any electric power generation and delivery system and is therefore not limited to the specific system 100 illustrated in FIG. 1. Accordingly, embodiments may be integrated, for example, in industrial plant power generation and delivery systems, deep-water vessel power generation and delivery systems, ship power generation and delivery systems, distributed generation power generation and delivery systems, and utility electric power generation and delivery systems.

The electric power generation and delivery system 100 may include generation, transmission, distribution, and power consumption equipment. For example, the system 100 may include one or more generators 110-116 that, in some embodiments, may be operated by a utility provider for generation of electrical power for the system 100. Generators 110 and 112 may be coupled to a first transmission bus 118 via step up transformers 120 and 122, which are respectively configured to step up the voltages provided to first transmission bus 118. A transmission line 124 may be coupled between the first transmission bus 118 and a second transmission bus 126. Another generator 114 may be coupled to the second transmission bus 126 via step up transformer 128 which is configured to step up the voltage provided to the second transmission bus 126.

A step down transformer 130 may be coupled between the second transmission bus 126 and a distribution bus 132 configured to step down the voltage provided by the second transmission bus 126 at transmission levels to lower distribution levels at the distribution bus 132. One or more feeders 134, 136 may draw power from the distribution bus 132. The feeders 134, 136 may distribute electric power to one or more loads 138, 140. In some embodiments, the electric power delivered to the loads 138, 140 may be further stepped down from distribution levels to load levels via step down transformers 142 and 144, respectively.

Feeder 134 may feed electric power from the distribution bus 132 to a distribution site 146 (e.g., a refinery, smelter, paper production mill, or the like). Feeder 134 may be coupled to a distribution site bus 148. The distribution site 146 may also include a distributed generator 116 configured to provide power to the distribution site bus 148 at an appropriate level via transformer 150. In some embodiments, the distributed generator 116 may comprise a turbine configured to produce electric power from the burning of waste, the use of waste heat, or the like. The distribution site 146 may further include one or more loads 138. In some embodiments, the power provided to the loads 138 from the distribution site bus 148 may be stepped up or stepped down to an appropriate level via transformer 142. In certain embodiments, the distribution site 146 may be capable of providing sufficient power to loads 138 independently by the distributed generator 116, may utilize power from generators 110-114, or my utilize both the distributed generator 116 and one or more of generators 110-114 to provide electric power to the loads.

IEDs 102-108 may be configured to control, monitor, protect, and/or automate the electric power system 100. As used herein, an IED may refer to any microprocessor-based device that monitors, controls, automates, and/or protects monitored equipment within an electric power system. An IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. In some embodiments, IEDs 102-108 may gather status information from one or more pieces of monitored equipment. Further, IEDs 102-108 may receive information concerning monitored equipment using sensors, transducers, actuators, and the like. Although FIG. 1 illustrates separate IEDs monitoring a signal (e.g., IED 104) and controlling a breaker (e.g., IED 108), these capabilities may be combined into a single IED.

FIG. 1 illustrates various IEDs 102-108 performing various functions for illustrative purposes and does not imply any specific arrangements or functions required of any particular IED. In some embodiments, IEDs 102-108 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 102-108 may be configured to communicate calculations, such as phasors (which may or may not be synchronized as synchrophasors), events, fault distances, differentials, impedances, reactances, frequency, and the like. IEDs 102-108 may also communicate settings information, IED identification information, communications information, status information, alarm information, and the like. Information of the types listed above, or more generally, information about the status of monitored equipment, may be generally referred to herein as monitored system data.

In certain embodiments, IEDs 102-108 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

The distributed site 146 may include an IED 108 for monitoring, controlling, and protecting the equipment of the distributed site 146 (e.g., generator 116, transformer 142, etc.). IED 108 may receive monitored system data, including current signals via current transformer (CT) 154 and voltage signals via potential transformer (PT) 156 from one or more locations (e.g., line 158) in the distribution site 146. The IED 108 may further be in communication with a breaker 160 coupled between the feeder 134 and the distribution site bus 148. In certain embodiments, the IED 108 may be configurable to cause the breaker 160 to disconnect the distribution site bus 148 from the distribution bus 132, based on monitored system data received via CT 154 and PT 156.

Feeder 136 may be communicatively coupled with an IED 106 configured to control a breaker 152 between the loads 140 and the distribution bus 132 based on monitored system data. In some embodiments, the power provided to the loads 140 from the distribution bus 132 may be stepped up or stepped down to an appropriate level via transformer 144. Like the IED 108 of the distribution site 146, monitored system data may be obtained by IED 106 using CTs and/or PTs (not shown).

Other IEDs (e.g., IED 104) may be configured to monitor, control, and/or protect the electric power generation and delivery system 100. For example IED 104 may provide transformer and generator protection to the step-up transformer 120 and generator 110. In some embodiments, IEDs 104-108 may be in communication with another IED 102, which may be a central controller, synchrophasor vector processor, automation controller, programmable logic controller (PLC), real-time automation controller, Supervisory Control and Data Acquisition (SCADA) system, or the like. For example, in some embodiments, IED 102 may be a synchrophasor vector processor, as described in U.S. Patent Application Publication No. 2009/0088990, which is incorporated herein by reference in its entirety. In other embodiments, IED 102 may be a real-time automation controller, such as is described in U.S. Patent Application Publication No. 2009/0254655, which is incorporated herein by reference in its entirety. IED 102 may also be a PLC or any similar device capable of receiving communications from other IEDs and processing the communications there from. In certain embodiments, IEDs 104-108 may communicate with IED 170 directly or via a communications network (e.g., network 162).

The central IED 102 may communicate with other IEDs 104-108 to provide control and monitoring of the other IEDs 104-108 and the power generation and delivery system 100 as a whole. In some embodiments, IEDs 104-108 may be configured to generate monitored system data in the form of time-synchronized phasors (synchrophasors) of monitored currents and/or voltages. IEDs 104-108 may calculate synchrophasor data using a variety of methods including, for example, the methods described in U.S. Pat. Nos. 6,662,124, 6,845,333, and 7,480,580, which are herein incorporated by reference in their entireties. In some embodiments, synchrophasor measurements and communications may comply with the IEC C37.118 protocol. In certain embodiments, IEDs 102-108 may receive common time signals for synchronizing collected data (e.g., by applying time stamps for the like). Accordingly, IEDs 102-108 may receive common time signals from time references 164-170 respectively. In some embodiments, the common time signals may be provided using a GPS satellite (e.g., IRIG), a common radio signal such as WWV or WWVB, a network time signal such as IEEE 1588, or the like.

Consistent with embodiments disclosed herein, IEDs 102-108 may be configured to determine a power system operating frequency from monitored system data. The operating frequency of the power system may be determined using many methods including, for example, measuring time between zero-crossings of voltage and/or current, measuring positive-sequence phasor rotations, measuring time between period voltage and/or current peaks, and/or the like. IEDs 102-108 may be further configured to indicate when an operating frequency falls below a predetermined level. In certain embodiments, an IED may have a number of different UF levels and may indicate when an operating frequency falls below one or more of the UF levels.

Figure 2:
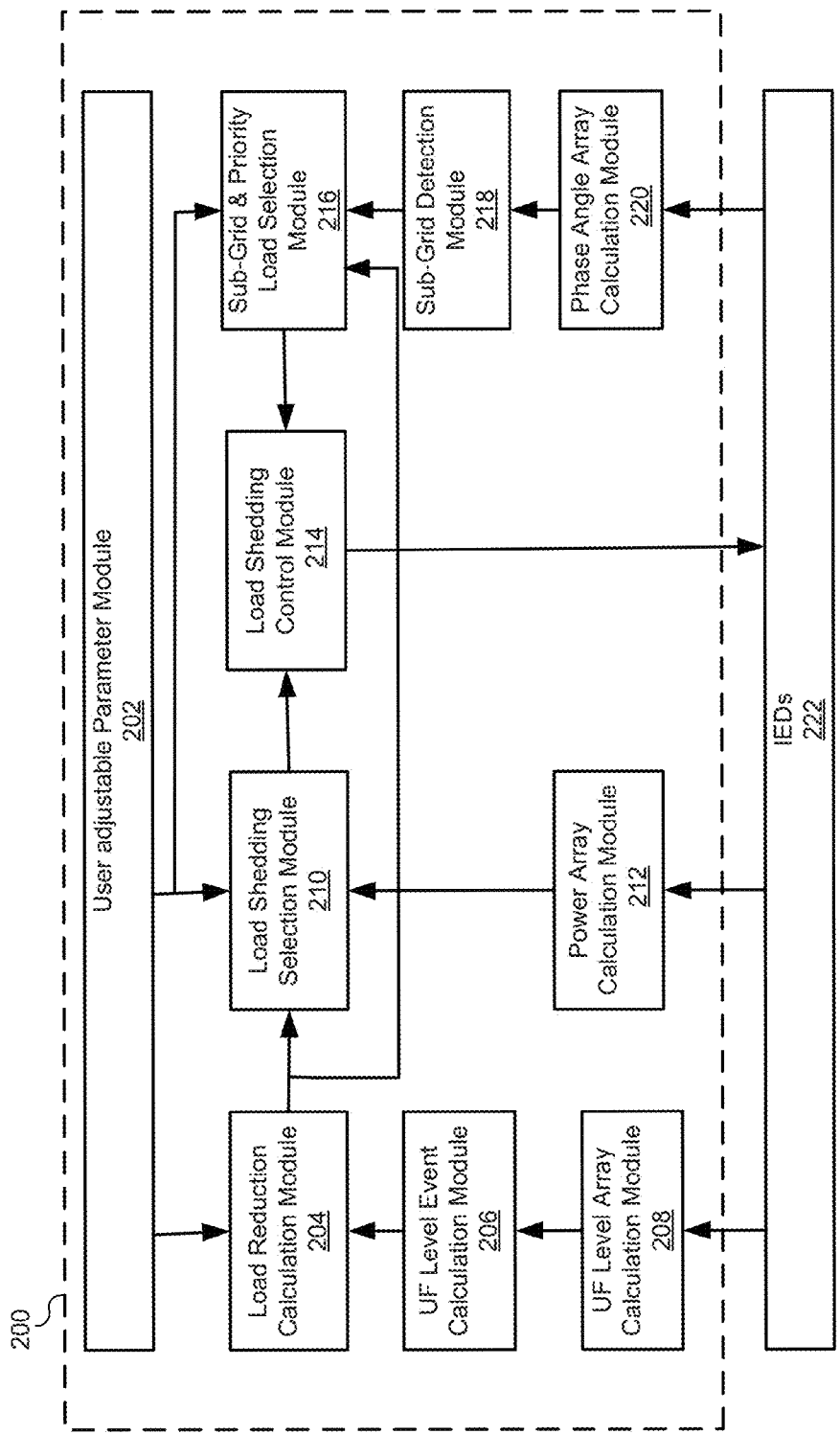
FIG. 2 illustrates a block diagram of one embodiment of an intelligent electronic device for protection and control of an electric power delivery system.

FIG. 2 illustrates a block diagram of an IED 200 for protection and control of an electric power delivery system (e.g., system 100 illustrated in FIG. 1). IED 200 may communicate with one or more IEDs 111 configured to provide indications of UF events (e.g., when system operating frequencies fall below one or more UF levels) to IED 200. In some embodiments, IEDs 222 may receive monitored system data and, based on the monitored system data, provide indications of UF events such as when measured operating frequencies fall below one or more UF levels to the IED 200.

In some embodiments, IEDs 222 may be programmed with a predetermined UF set point (e.g., level) and be configured to provide time synchronized indications of UF events to the IED 200. In some embodiments, IEDs 222 may include one or more set points (e.g., levels) and be configured to provide time synchronized indications of UF events (e.g., when one or more of the set points are crossed) to the IED 200. Further, in certain embodiments, IEDs 222 may indicate the UF set point (e.g., level) breached, a time indication of the UF event, the power consumed by a load associated with the IED, and/or synchrophasor data which may include a load angle.

Based on the UF event indications received from IEDs 222, IED 200 may determine whether specific loads are exhibiting UF events and whether such loads can be disconnected (e.g., shed) to limit and/or avoid UF events and systems disturbances. This functionality may be achieved using one or more functional modules 202-220 included in the IED 200. For example, indications of UF events (e.g., breached UF set points, time indications of UF events, power consumed by loads associated with the IEDs, and/or synchrophasor data) detected by IEDs 222 may be provided to a UF level array calculation module included in the IED 200. In certain embodiments, UF level array calculation module 208 may be configured to order UF events and their associated information based on time stamps indicating when the UF events were received by their associated IEDs 222 (e.g., UF events may be ordered based on their time of occurrence). Information from the UF level array calculation module 208, including one or more ordered UF events may be provided to a coinciding UF level event calculation module 206. The UF level event calculation module 206 may be configured to determine whether the one or more UF events ordered by the UF level array calculation module 208 are associated with a larger system UF event based on the time stamps associated with the one or more UF events. For example, the UF level event calculation module 206 may determine that a particular set of UF events ordered by the UF level array calculation module 208 are associated with a larger system UF event based on their occurrence within a particular time period (e.g, a 10 ms period). Based on the UF events occurring within a particular time period, the UF level array calculation module 208 may determine that the loads associated with the UF events are associated with a power sub-grid experiencing a UF condition and provide this information to a load reduction calculation module 204.

The IED 200 may also include a user adjustable parameter module 202 that, in some embodiments, includes parameters defining an amount of load to be shed for a particular UF-level. In some embodiments, the amount of load to be shed may be in the form of a power/frequency value (e.g., MW/Hz). Information regarding the amount of load to be shed for a particular UF-level may be provided to the load reduction calculation module 204. The load reduction calculation module 204 may also utilize information regarding the UF events provided by the UF level array calculation module 208 and UF level event calculation module 206, including time indications of UF events and indications of UF set points breached. Based on the information received by the load reduction calculation module 204, the load reduction calculation module 204 may determine an amount of load to shed (e.g., the about of load to shed from the system measured in MW) based on the defined user parameters and the other received UF event information.

IEDs 222 may be further configured to monitor the power consumed by the loads they are associated with. Information regarding the power consumed by loads associated with the IEDs 222 may be monitored in terms of power (e.g., MW) or other coupled parameters such as current. For example, in reference to FIG. 1, IED 106 may be capable of monitoring the power consumed by loads 140, and IED 108 may be capable of indicating the power presented consumed by the distributed site 146.

Consistent with some embodiments, information regarding the power consumed by loads may be provided to a power array calculation module 212 included in the IED 200. In some embodiments, the power array calculation module 212 may calculate a power consumption value for each load (e.g., by using parameters coupled to power consumption such as current). Further, the power array calculation module 212 may sort and/or order specific loads based on their associated power consumption.

The user adjustable parameter module 202 may include a parameter that includes a priority indication for loads associated with the IEDs 222. For example, the priority indication may include a priority queue indicating the order in which loads should be shed from the system in the event of an UF condition. Accordingly, the priority indication may indicate certain loads (e.g., a hospital) that should stay connected to the system in the event of an UF condition.

The information generated by the power array calculation module 212 may be provided to a load shedding selection module 210 included in the IED 200 along with the priority indication provided by the user adjustable parameter module 202. The load shedding selection module 210 may further receive information related to an amount of load to shed from the load reduction calculation module 204. Based on the received information (e.g., the amount of load to shed, the priority of the loads, and the amount of power consumed by the loads), the load shedding selection module 210 may determine which loads should be shed to reduce the effects of the detected UF event in the system. That is, the load shedding selection module 210 may match the amount of power to shed with the power used by each of the loads, prioritized by the priority information, and determine which loads to shed.

In some embodiments, the IED 200 may include a load shedding control module 214 configured to receive an indication from the load shedding selection module 210 of which loads should be shed and provide a control signal to the IEDs 222 associated with the loads that should be shed directing the IEDs 222 to shed (e.g., disconnect) the relevant loads from the system. For example, in reference to FIG. 1, the load shedding selection module 210 may determine that loads 140 should be shed, and the load shedding control module 214 may direct the IED 106 associated with the loads 140 to trip breaker 152, thereby disconnecting the loads from the system 100.

Information regarding power sub-grids within a greater grid topology of an electric power delivery system may also be used by the IED 200 to calculate which loads should be shed in view of UF conditions. In this context, IEDs 222 may provide load angle information (e.g., synchrophasor information) to a phase angle array calculation module 220 included in the IED 200. In an electric power generation and delivery system, equipment (e.g., loads) associated with a certain power sub-grid of the electric power generation and delivery system may experience similar frequency decay rates when the system experiences an UF condition. Similarly, equipment associated with different power sub-grids may experience different frequency decay rates when the system experiences an UF.

For example, in a system having two sub-grids within a greater grid topology of an electric power delivery system, the probability of both sub-grids experiencing the same frequency decay rate in a system UF condition is low. In certain conditions, the frequency in one sub-grid may increase while the frequency in the other sub-grid may decrease. Moreover, even in conditions where both sub-grids exhibit a decay in frequency, the frequency decays will likely reach set UF threshold levels at differing times. Based on the above, by analyzing the decay rates and times of loads within a system, the IED 200 may determine which loads are associated with a particular power sub-grid. For example, if certain loads exhibit similar frequency decay rates occurring at similar times (e.g., within a 2 ms period), the IED 200 may determine that the loads are associated with a particular power sub-grids. In some embodiments, IED 200 and its associated modules 202-220 may determine which loads are associated with a particular power sub-grid based on the methods described in U.S. Patent Application Publication No. 2009/0089608 which is herein incorporated by reference in its entirety.

To enable the IED 200 to determine which loads are associated with a particular power sub-grid, IEDs 222 may communicate time-synchronized load phase measurements to IED 200 using, for example, the IEC C38.118 protocol. Load angles measured by the IEDs 222 may be provided to the phase angle array calculation module 220 that, in some embodiments, may store such information. The phase angle array calculation module 220 may provide the measured load angles to a sub-grid detection module 218. Based on the measured load angles, the sub-grid detection module 218 may determine whether loads associated with the IEDs 222 are associated with particular sub-grids.

Information regarding which loads are associated with particular sub-grids may be provided to a sub-grid and priority based load selection module 216. The sub-grid and priority based load selection module 216 may also receive the parameter that includes a priority indication for loads associated with the IEDs 222 from the user adjustable parameter module 202. Additionally, the sub-grid and priority based load selection module 216 may receive an indication of the amount of load to be shed from the load reduction calculation module 204.

Based on the information related to which loads are associated with particular sub-grids, the priority information for the loads, and/or the amount of load to be shed, the sub-grid and priority based load selection module 216 may determine which loads should be shed by the system to reduce the effects of UF conditions. This information may provided by the sub-grid and priority based load selection module 216 to the load shedding control module 214. The load shedding control module may then use this information in conjunction with the information received from the load shedding selection module to determine which loads should be shed and direct the appropriate IEDs 222 to shed the loads from the system.

In some embodiments, the modules 202-220 included in IED 200 may be implemented in a programmable IED system. For example, the functionality of IED 200 may be achieved using a synchrophasor vector process (e.g., the SEL-3378 available for Schweitzer Engineering Laboratories, Inc.) or a real-time automation controller (e.g., the SEL-3530 available from Schweitzer Engineering Laboratories, Inc.).

Figure 3:
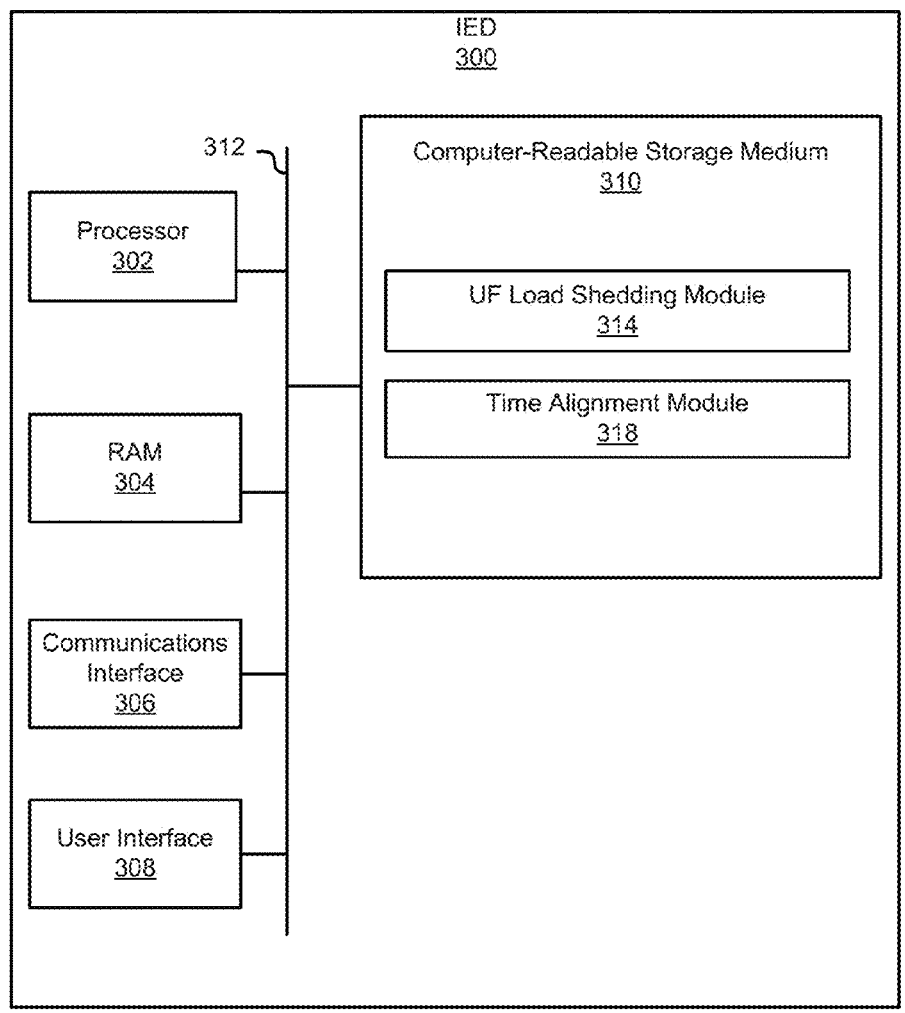
FIG. 3 illustrates another block of one embodiment of an intelligent electronic device for protection and control of an electric power delivery system.

FIG. 3 illustrates another block of an IED 300 for protection and control of an electric power delivery system. As illustrated, IED 300 may include a processor 302, a random access memory (RAM) 304, a communications interface 306, a user interface 308, and a computer-readable storage medium 310. The processor 302, RAM 304, communications interface 306, user interface 308, and computer-readable storage medium may be communicatively coupled to each other via a common data bus 312. In some embodiments, the various components of IED 300 may be implemented using hardware, software, firmware, and/or any combination thereof.

The user interface 308 may be used by a user to enter user defined settings such as, for example, an amount of load to shed for each event level, load priority information, and the like (e.g., the parameters included in the user adjustable parameter module 202 of FIG. 2). The user interface 308 may be integrated in the IED 300 or, alternatively, may be a user interface for a laptop or other similar device communicatively coupled with the IED 300. Communications interface 306 may be any interface capable of communicating with IEDs and/or other electric power system equipment communicatively coupled to IED 300. For example, communications interface 306 may be a network interface capable of receiving communications from other IEDs over a protocol such as the IEC 61850 or the like. In some embodiments, communications interface 306 may include a fiber-optic or electrical communications interface for communicating with other IEDs.

The processor 302 may include one or more general purpose processors, application specific processors, microcontrollers, digital signal processors, FPGAs, or any other customizable or programmable processing device. The processor 302 may be configured to execute computer-readable instructions stored on the computer-readable storage medium 310. In some embodiments, the computer-readable instructions may be computer executable functional modules. For example, the computer-readable instructions may include an UF load shedding module 314 configured to cause the processor to perform the UF load shedding operations and a time alignment module 316 used time-aligning and coordinating various communications to and from IEDs connected to the IED, as described in reference to FIG. 2. The computer-readable instructions may also include any of the functional modules described in reference to FIG. 2 to implement the functionality of the IED 200 described therein.

Figure 4:
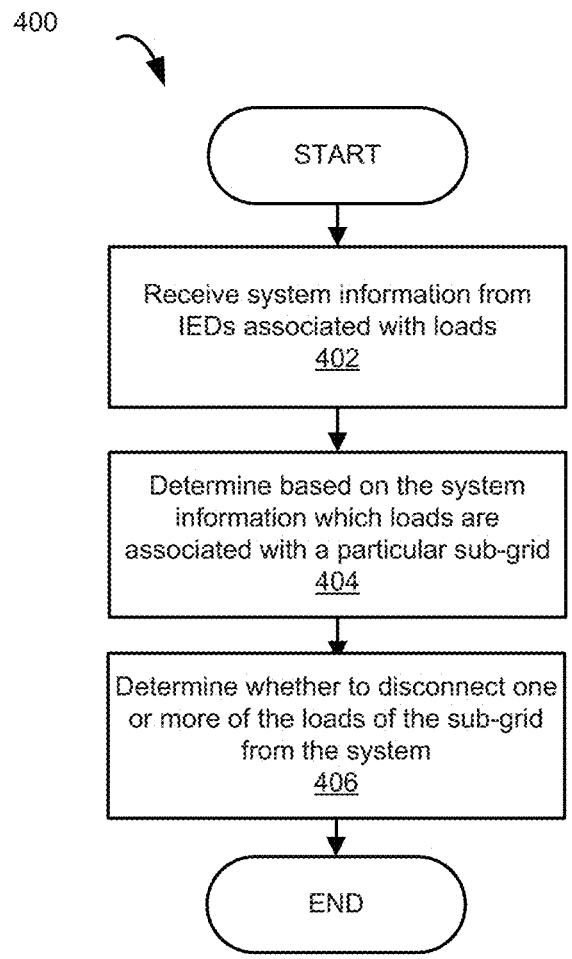
FIG. 4 illustrates one embodiment of a method for protection and control of an electric power delivery system.

FIG. 4 illustrates one embodiment of a method 400 for protection and control of an electric power delivery system. At 402, a central IED may receive system information from a remote IEDs each associated with a load. In certain embodiments, the system information may include information relating to the operating frequencies of the loads, the power consumption of the loads, synchrophasor information, an indication that an operating frequency of a load has reached a predetermined level, and the like. Based on this system information, at 404, the central IED may determine which loads are associated with a particular sub-grid of the electric power delivery system experiencing an UF condition. In certain embodiments, determining which loads which loads are associated with a particular sub-grid of the electric power delivery system is based on the decay rates and/or decay times of operating frequencies of the loads. At step 406, the central IED may determine whether to disconnect one or more loads associated with the sub-grid from the electric power delivery system to mitigate the UF condition, sending a signal to IEDs associated with the one or more loads directing the IEDs to disconnect the loads. As discussed above, in some embodiments, determining which loads to disconnect from the electric power delivery system may be based on priority information associated with the loads.

In another embodiment, underfrequency rotor speed conditions (which may include rotor speeds, frequencies, rate-of-change-of-speed, or the like) may be determined using rotor angles. As used herein, the frequency of a generator may be referred to as rotor speed. As described above, a central IED may receive system information from remote IEDs each associated with a load, where the system information may include a frequency and/or detected UF conditions. In this particular embodiment, synchronous machines may be monitored by IEDs, and the rotor angles of the synchronous machines may be determined by the IEDs and communicated with the central IED for sub-grid determination. IEDs may determine rotor position or frequency using, for example, a toothed wheel and a magnetic pickup unit. It should be understood that various systems for determining a rotor position or rotor frequency may be used such as, for example, optical rotor position sensors, mechanical rotor position sensors, toothed wheel sensors, and the like. Rotor position may be used by the IED to determine rotor frequency, rate of change of frequency, rotor angle, power angle, or the like.

Figure 5A:
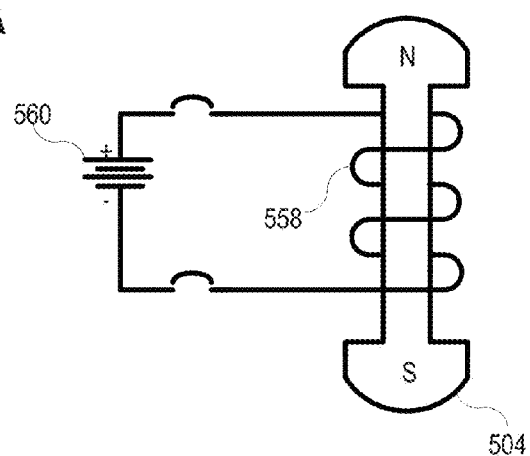
FIG. 5A illustrates a conceptual diagram of a rotor of a synchronous generator consistent with embodiments disclosed herein.

FIG. 5A illustrates a conceptual diagram of a rotor 504 of a synchronous generator consistent with embodiments disclosed herein. A rotor 504 may be driven by an external torque (not shown) to induce an electromagnetic field (EMF) in a stationary stator (e.g., stator 553 illustrated in FIG. 5B). The rotor 504 includes a field winding 558 wrapped around a rotor body, and the stator includes an armature winding wrapped around an armature body. A direct current is made to flow in the field winding 558 (using, for example, an exciter voltage 560) to generate a magnetic field in the rotor 504. Additionally or alternatively, permanent magnets may also be used.

Figure 5B:
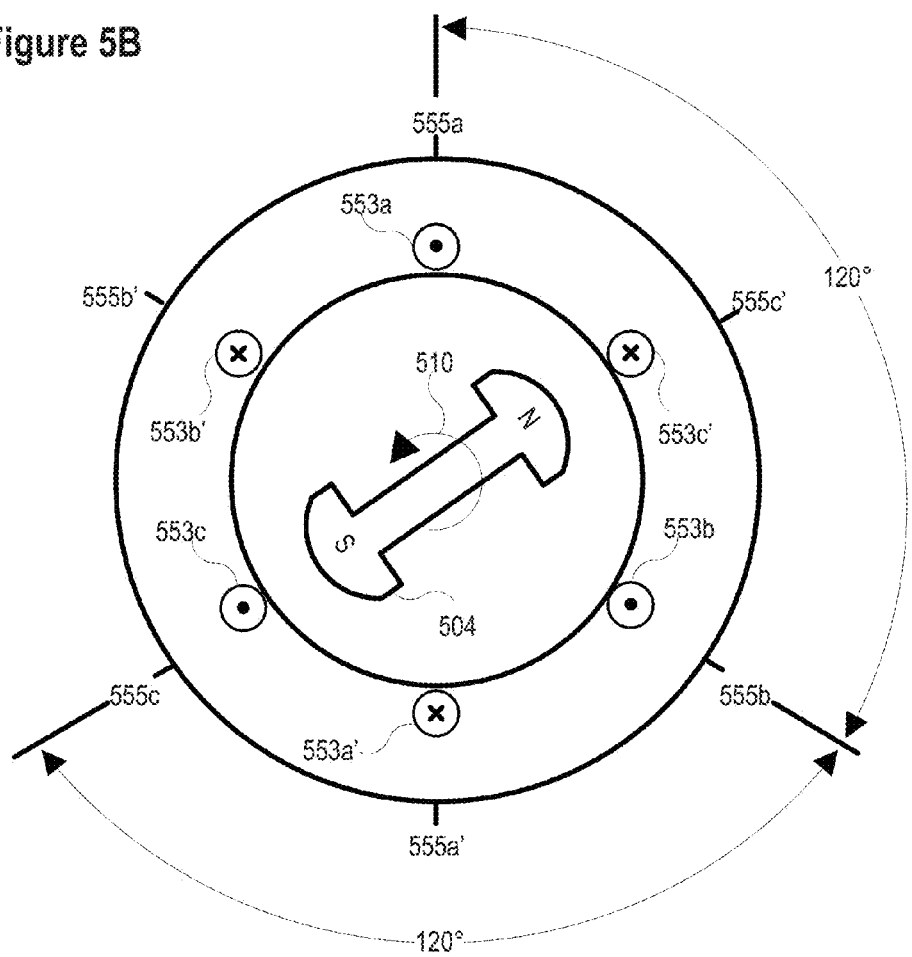
FIG. 5B illustrates a conceptual diagram of the rotor illustrated in FIG. 5A and a stator, which together may operate as a synchronous generator.

FIG. 5B illustrates a 3-phase synchronous generator that includes three sets of stator windings 553a to 553a', 553b to 553b', and 553c to 553c' consistent with embodiments disclosed herein. The stator windings are each separated by 120° such that when an electrical field associated with the rotor 504 passes, the electrical currents induced in terminal pairs 555a and 555a', 555b and 555b', and 555c and 555c' are each separated by 120 electrical degrees. When the rotor 504 rotates, as indicated by arrow 510, the magnetic field rotates with it, passing the stator windings and inducing a time-varying electric current therein. As the poles of the electrical field associated with the rotor 504 pass the stator windings, the voltage present on the corresponding terminals oscillates, and an alternating current results. Thus, the angular position of the rotor 504 is related to the time-varying electrical output of the terminals 555a-c. As described below, this relationship can be influenced by, for example, an electrical load connected to the terminals of the generator.

The period ($T_I$) of the resulting alternating current from a synchronous generator with N poles, and which has a period of rotation of $T_G$, can be calculated using the formula:

$$T_I = NT_G \quad \text{Eq. 1}$$

Embodiments disclosed herein may be applied to any rotor regardless of the number of phases or pairs of poles included therein.

The position of the generator rotor axis is a function of a mechanical power input on the generator and an opposing electrical torque attributed to the electric output from the generator. These opposing forces result in a torque on the rotor. In a steady state condition (i.e., normal operating conditions) these forces are equal in magnitude but opposite in direction. In conditions where the mechanical torque and the electrical torque fall out of balance, the power angle may shift or oscillate, depending on the magnitude and nature of the imbalance.

FIG. 6 is one illustration of a power angle curve that shows the relationship between a power angle ($\delta$) and an input mechanical power ($P_m$). Under balanced conditions, input mechanical power $P_m$ results in equilibrium with the electrical energy drawn from the generator. When the electric torque that balances the mechanical torque decreases (i.e., as a result of an increase in the mechanical power input or a decrease in the electrical load attached to the generator), the rotor rotates at an increased rate, thus causing the power angle to increase. For example, in FIG. 6, the mechanical power may increase to $P_{m1}$ from $P_{m0}$, resulting in an increase in the power angle from $\delta_0$ to $\delta_f$. In a stable system, the rotor would experience negative acceleration, and eventually come into equilibrium. If the power input exceeds a maximum power input threshold, $P_{max}$, the generator may become unstable. Knowing the maximum power angle, $\delta_{max}$, and the associated maximum power input threshold, $P_{max}$, allows an operator to determine how much power can be safely produced by a generator without causing the generator to become unstable.

Figure 7:
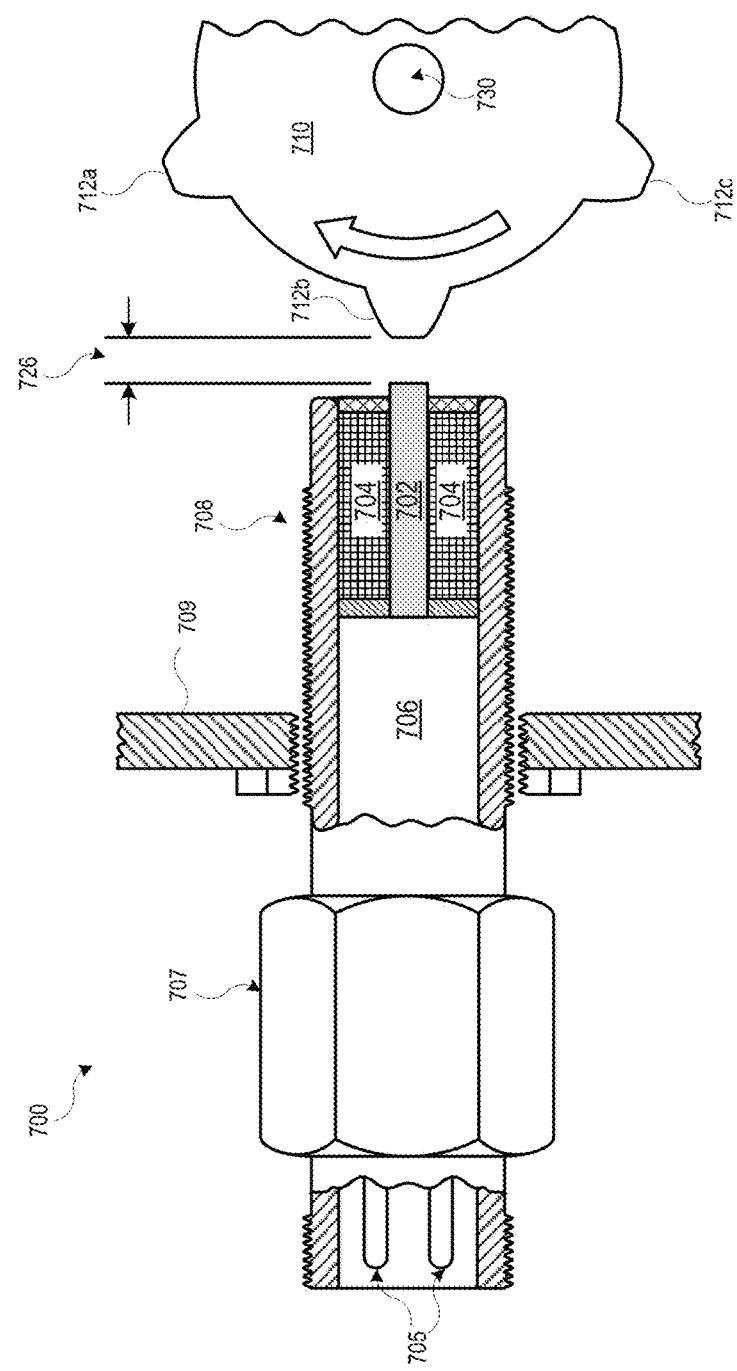
FIG. 7 illustrates a simplified partial cross-sectional view of a magnetic pickup unit (MPU) consistent with embodiments disclosed herein.

FIG. 7 illustrates a simplified partial cross-sectional view of an MPU 700 consistent with embodiments disclosed herein. MPU 700 is operable to track the passing of a plurality of teeth 712a-c associated with a tooth wheel 710 and may be utilized in connection with an electrical generator (not shown). A shaft connected to a rotor (not shown) of the generator may pass through aperture 730 of tooth wheel 710. MPU 700 includes a magnet 706, which in certain embodiments may be permanent, a pole-piece 702, a sensing coil 704, and a case 708. Case 708 may extend through a housing 709. An air gap 726 separates tooth wheel 710 from MPU 700. Coil 704 may be disposed around a pole-piece 702, which is disposed across air gap 726 from the plurality of teeth 712a-c. Pole piece 702 abuts permanent magnet 706. A connector 707 may be used to connect MPU 700 to an IED (not shown) or other device configured to monitor the power angle of a generator associated with MPU 700.

The passing of the plurality of teeth 712a-c in proximity to pole-piece 702 causes a distortion of the magnetic flux field passing through the sensing coil 704 and pole-piece 702, which in turn generates a signal voltage. In certain embodiments, tooth wheel 710 may be formed of ferrous material. The voltage induced in sensing coil 704 is proportional to the rate of change of flux in the magnetic field, where the rate of change of flux is determined by the size of the air gap 726, and the rotational velocity of the tooth wheel 710, as provided in Eq. 2.

$$\varepsilon = -N\frac{d\Phi}{dt} \quad \text{Eq. 2}$$

In Eq. 2, $\varepsilon$ represents the voltage induced in the sensing coil 704, N represents the number of coil turns in the sensing coil 704, and $\Phi$ represents the flux in the magnetic field generated by permanent magnet 706. A plurality of leads 705 may be used to transmit the signal generated by MPU 700 to an IED or other device. The frequency of the induced voltage is proportional to the number of teeth on the wheel and the speed of rotation, according to Eq. 3.

$$\text{Frequency (Hz)} = \frac{\text{Number of Teeth} * \text{RPM}}{60} \quad \text{Eq. 3}$$

An IED, such as IED 300, in electrical communication with the MPU or other rotor sensor may receive the electrical signals therefrom to detect a rotor position of the synchronous machine. With the rotor position, the IED may be calculate the frequency of the synchronous machine in accordance with Equation 3. The IED may also be configured to determine a rotor angle and/or power angle of the synchronous machine using the rotor position, frequency, time, and/or available current and/or voltage information from the power system. The IED may be configured to determine a UF event using the frequency calculated using the MPU or other such sensor as described herein. The IED may communicate the UF event along with a time thereof to a central IED such as IED 102 of FIG. 1. IED 102 may then use the UF events and time stamps of several IEDs to determine which IEDs are on the same sub-grid. As described in further detail herein, equipment on common isolated sub-grids may experience similar UF events at similar times. Furthermore, equipment on common isolated sub-grids may experience similar frequencies, and similar rates-of-change-of-frequencies at similar times. Thus, a central IED may be configured to use the time-stamped UF events, frequencies, rates-of-change-of-frequencies, or the like from several IEDs to determine which IEDs of the several IEDs are on common isolated sub-grids. Rotor angles (and hence mechanical speed and acceleration) are related to the electrical power system phase angle, frequency, and rate-of-change-of-frequency by the synchronous machine pole counts by the square of the pole count. For example, the rotor speed equals the frequency multiplied by two divided by the pole count.

Figure 8:
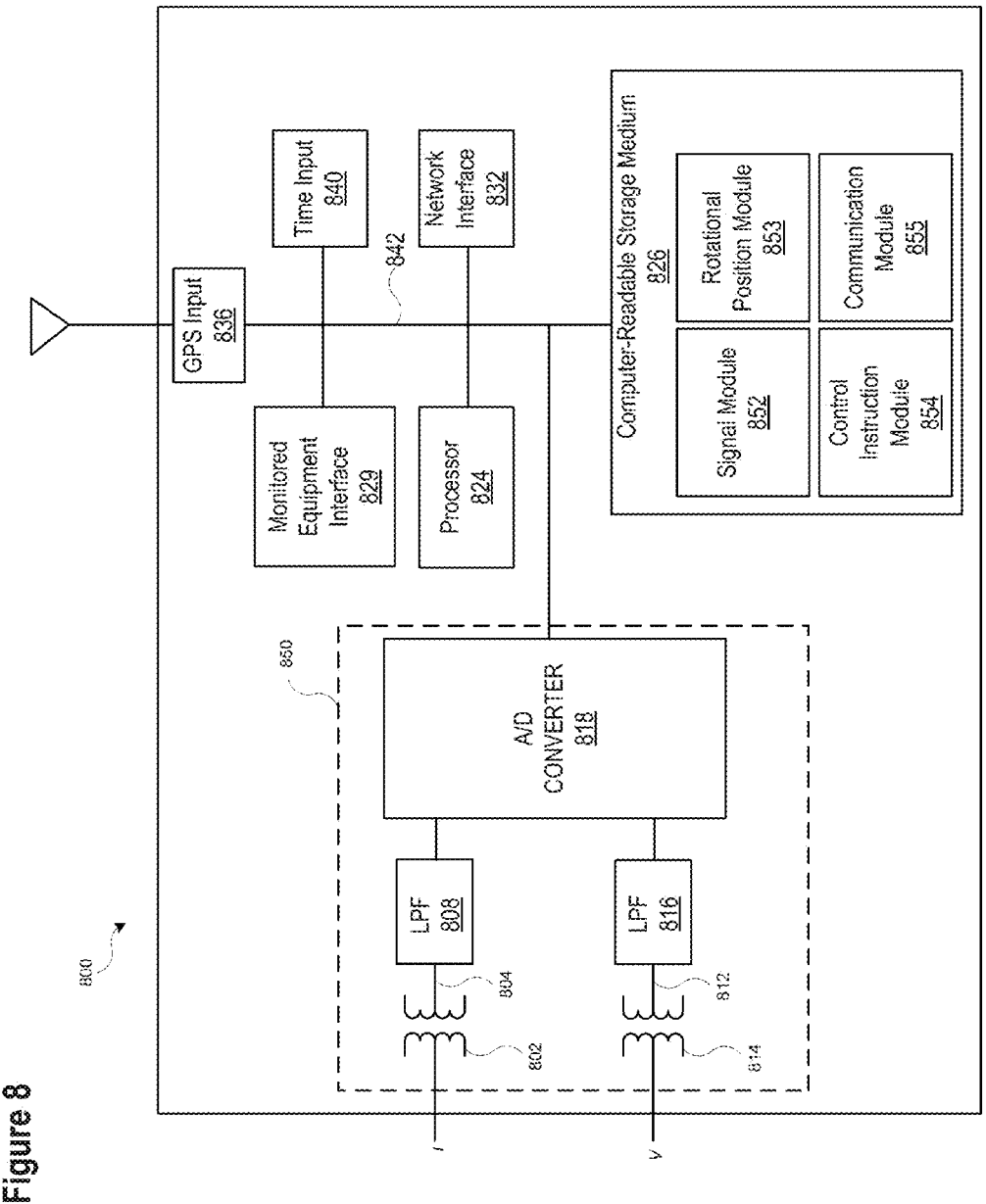
FIG. 8 illustrates another block diagram of one embodiment of an intelligent electronic device for protection and control of an electric power delivery system.

FIG. 8 illustrates a block diagram of an IED that may be used to collect signals from the generator, determine rotor position, frequency, rate-of-change-of-speed, rotor angle, power angle, and the like from a generator. IED 800 includes a network interface 832 configured to communicate with a data network. IED 800 also includes a time input 840, which may be used to receive a time signal. In certain embodiments, time input 840 may be used to generate a reference signal, as described above. In certain embodiments, a common time reference may be received via network interface 832, and accordingly, a separate time input and/or GPS input 836 would not be necessary. One such embodiment may employ the IEEE 1588 protocol. Alternatively, a GPS input 836 may be provided in addition or instead of a time input 840.

A monitored equipment interface 829 may be configured to receive status information from, and issue control instructions to a piece of monitored equipment, such as an electrical generator. According to certain embodiments, the monitored equipment interface 829 may be configured to interface with an MPU and/or Hall-Effect sensor that generates a signal based upon the detection of the passage of one or more teeth associated with a tooth wheel coupled to a rotor in an electrical generator.

A computer-readable storage medium 826 may be the repository of one or more modules and/or executable instructions configured to implement any of the processes described herein. A data bus 842 may link monitored equipment interface 829, time input 840, network interface 832, GPS input 836, and computer-readable storage medium 826 to a processor 824.

Processor 824 may be configured to process communications received via network interface 832, time input 840, GPS input 836, and monitored equipment interface 829. Processor 824 may operate using any number of processing rates and architectures. Processor 824 may be configured to perform various algorithms and calculations described herein using computer executable instructions stored on computer-readable storage medium 826. Processor 824 may be embodied as a general purpose integrated circuit, an application specific integrated circuit, a field-programmable gate array, and other programmable logic devices.

In certain embodiments, IED 800 may include a sensor component 850. In the illustrated embodiment, sensor component 850 is configured to gather data directly from a conductor (not shown) using a current transformer 802 and/or a voltage transformer 814. Voltage transformer 814 may be configured to step-down the power system's voltage (V) to a secondary voltage waveform 812 having a magnitude that can be readily monitored and measured by IED 800. Similarly, current transformer 802 may be configured to proportionally step-down the power system's line current (I) to a secondary current waveform 804 having a magnitude that can be readily monitored and measured by IED 800. Low pass filters 808, 816 respectively filter the secondary current waveform 804 and the secondary voltage waveform 812. An analog-to-digital converter 818 may multiplex, sample and/or digitize the filtered waveforms to form corresponding digitized current and voltage signals.

As described above, certain embodiments may monitor the terminal voltage of one or more phases of electrical power generated by an electrical generator. Sensor component 850 may be configured to perform this task. Further, sensor component 850 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

A/D converter 818 may be connected to processor 824 by way of a bus 842, through which digitized representations of current and voltage signals may be transmitted to processor 824. In various embodiments, the digitized current and voltage signals may be compared against conditions. For example, certain conditions may be established in order to implement one or more control actions based upon a determination that a power angle exceeds a threshold. The control action may include an instruction to reduce the load connected to the generator (e.g., by load shedding) or an instruction to increase generation capacity.

A monitored equipment interface 829 may be configured to receive status information from, and issue control instructions to a piece of monitored equipment. As discussed above, control actions may be issued when the power angle of a generator is outside of an acceptable range in order to cause the power angle to return to the acceptable range. Monitored equipment interface 829 may be configured to issue control instructions to one or more pieces of monitored equipment. According to some embodiments, control instructions may also be issued via network interface 832. Control instructions issued via network interface 832 may be transmitted, for example, to other IEDs (not shown), which in turn may issue the control instruction to a piece of monitored equipment. Alternatively, the piece of monitored equipment may receive the control instruction directly via its own network interface.

Computer-readable storage medium 826 may be the repository of one or more modules and/or executable instructions configured to implement certain functions described herein. For example, a signal module 852 may be configured to generate or analyze a reference signal and/or a rotational position signal. Signal module 852 may further be configured to detect a relative shift between the reference signal and the rotational position signal. The rotational position module 853 may be configured to determine the rotational position of the rotor based upon the relative shift between the reference signal and the rotational position signal. Further, the rotational position module 853 may be configured to determine whether the rotational position is within an acceptable range. The determination of whether the rotational position is within an acceptable range may be used to determine when control actions are to be implemented in order to cause the rotational position to return to the acceptable range. Control instruction module 854 may be configured to issue appropriate control instructions in order to maintain the electrical generator within the acceptable range or to cause the rotational position to return to the acceptable range. Communication module 855 may facilitate communication between IED 800 and other IEDs (not shown) via network interface 832, such as the central IED. In addition, communication module 755 may further facilitate communication with monitored equipment in communication with IED 800 via monitored equipment interface 829 or with monitored equipment in communication with IED 800 via network interface 832.

Figure 9:
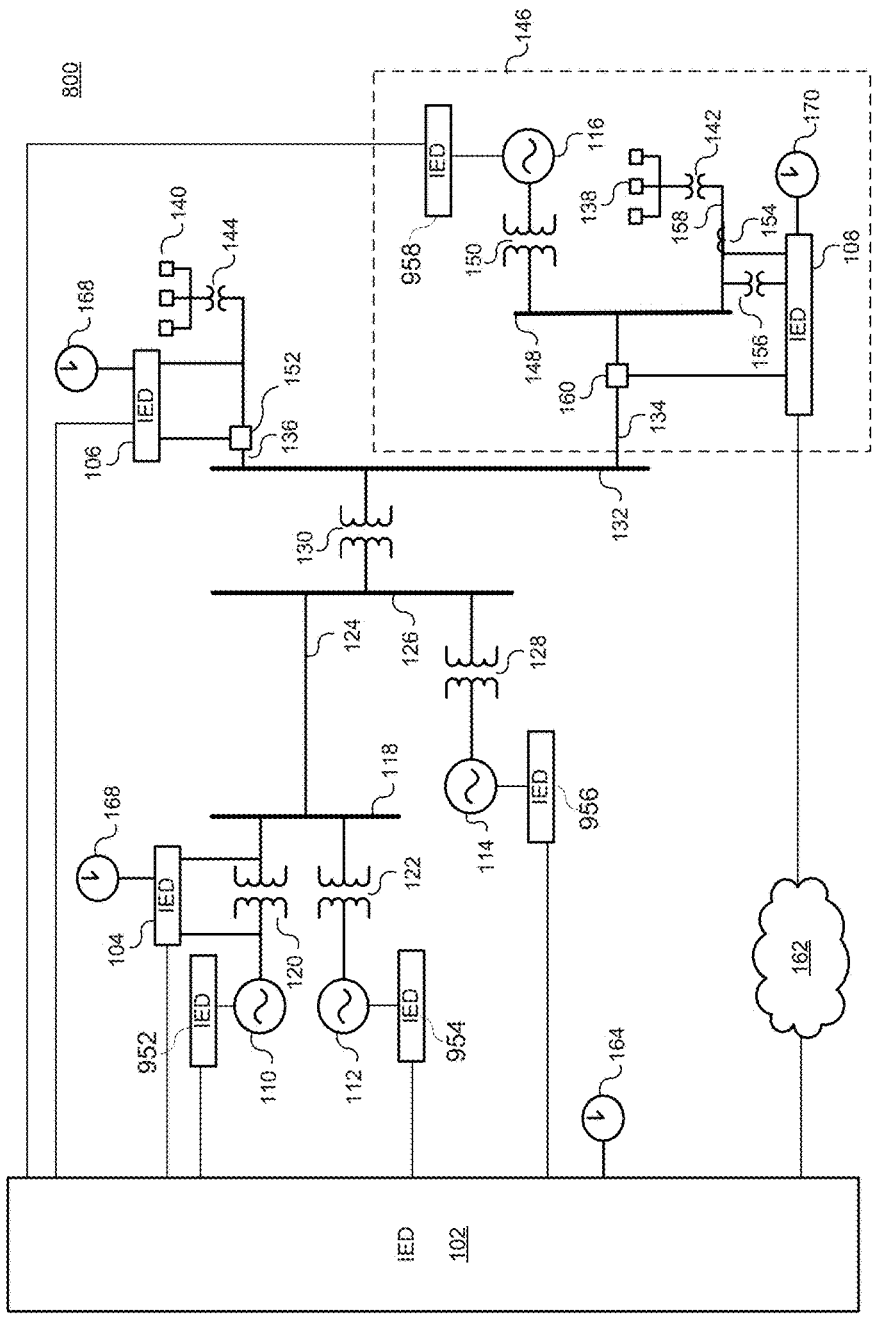
FIG. 9 illustrates a simplified diagram of one embodiment of an electric power delivery system that includes intelligent electronic devices.

FIG. 9 illustrates another simplified diagram of an electric power generation and delivery system similar to that of FIG. 1. The system illustrated in FIG. 9 includes IEDs 952, 954, 956, and 958, each in communication with and configured to monitor and protect generators 110, 112, 114, and 116, respectively. IEDs 952-958 may be configured to monitor a rotational position of the rotors of their connected generators, determine rotor position, frequency, rate-of-change-of-speed, rotor angle, and/or power angle as described herein. IEDs 952-958 may further be configured to transmit the determined rotor position, frequency, rate-of-change-of-speed, rotor angle, and/or power angle to the central IED 102. Central IED 102 may be configured to determine which generators are connected to common isolated sub-grids according to the various embodiments described herein.

For example, when IED 952 determines that generator 110 is experiencing an underfrequency condition using rotor position information therefrom, and IED 954 determines that generator 112 is experiencing an underfrequency condition using rotor position information therefrom within a predetermined time of the detection from IED 952, central IED 102 may determine that generators 110 and 112 are on a common isolated sub-grid. The predetermined time may be, for example, 2 seconds. In another embodiment, the predetermined time may be 0.5 seconds. Furthermore, if the remaining IEDs did not communicate such underfrequency condition, then the central IED may determine that generators 110 and 112 are on a common isolated sub-grid that is separate from the other generators of the system.

While specific embodiments and applications of the disclosure have been illustrated and described, it is to be understood that the disclosure is not limited to the price configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electrical system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. A system for detecting a rotor speed condition on an electric power delivery system, comprising:
   a plurality of generators each in electrical communication to supply electrical power to the electric power delivery system,
   a plurality of generator rotor position detection devices, each in communication with one generator of the plurality of generators, configured to output a signal corresponding with a rotor position of the generator;
   a plurality of intelligent electronic devices (IEDs), each IED of the plurality of IEDs in communication with one of the generators and with one of the generator rotor position detection devices, the plurality of IEDs each configured to detect a rotor speed condition using the output of the generator rotor position detection device in communication therewith and to communicate the rotor speed condition; and
   a central IED communicatively coupled with the plurality of IEDs, the central IED configured to
   determine which generators of the plurality of generators are connected on a common isolated sub-grid based on:
   the rotor speed conditions communicated from the plurality of IEDs; and, times associated with the rotor speed conditions communicated from the plurality of IEDs; and
   determine which loads of a plurality of loads are connected on the common isolated sub-grid based on electric power delivery system information communicated from IEDs associated with the plurality of loads;
   wherein the system provides operational control of the electric power delivery system by signaling appropriate IEDs of the plurality of IEDs to modify associated generation or load based on the determination of which generators are connected on a common isolated sub-grid and which loads are connected on the common isolated subgrid.

2. The system of claim 1, wherein the central IED is configured to determine which generators are connected on a common isolated sub-grid based on times of detected rotor speed conditions.

3. The system of claim 1, wherein the plurality of IEDs are further configured to transmit speed information to the central IED.

4. The system of claim 3, wherein the central IED is configured to determine which generators are connected on a common isolated sub-grid based on the speed information from the plurality of IEDs.

5. The system of claim 1, wherein the plurality of IEDs are further configured to transmit a rate-of-change-of-speed to the central IED.

6. The system of claim 5, wherein the central IED is configured to determine which generators are connected on a common isolated sub-grid based on the rate-of-change-of-speed information from the plurality of IEDs.

7. A method for detecting a condition on an electric power delivery system using a central intelligent electronic device (IED), comprising:
   detecting at a plurality of IEDs each in communication with one of a plurality of electric generators, rotor positions of the generators using a rotor position detection device;
   determining, at the plurality of IEDs, speeds of the generators using the rotor positions;

determining, at the plurality of IEDs, rotor speed conditions using the frequencies;

transmitting the rotor speed conditions to a central IED;

determining, at the central IED, which generators are connected to common isolated sub-grids using:
 the rotor speed conditions; and
 times associated with the rotor speed conditions transmitted from the plurality of IEDs;

determining, at the central IED, which loads are connected to common isolated sub-grids based on electric power delivery system information communicated from IEDs associated with the loads;

determining occurrence of an underfrequency event using the rotor speed conditions;

calculating an amount of load to shed based on the underfrequency event;

determining which loads to shed based on the underfrequency event and the generators and loads determined to be on common isolated sub-grids; and an IED of the plurality of IEDs providing operational control of the electric power delivery system by shedding an associated load based on the determination of which loads to shed.

8. The method of claim 7, further comprising receiving, at the plurality of IEDs, signals from a toothed-wheel detector of the rotor position detection devices.

9. The method of claim 7, further comprising determining, at the plurality of IEDs, a rotor speed using the rotor positions.

10. The method of claim 9, wherein the step of determining which generators are connected to common isolated sub-grids comprises using the rotor frequencies.

11. The method of claim 7, further comprising determining, at the plurality of IEDs, rates-of-change-of-frequencies using the rotor positions.

12. The method of claim 11, wherein the step of determining which generators are connected to common isolated sub-grids comprises using the rates-of-change-of-frequencies.

* * * * *